United States Patent
Lee

(10) Patent No.: US 10,447,975 B2
(45) Date of Patent: Oct. 15, 2019

(54) CCTV AUTOMATIC SELECTION MONITORING SYSTEM, AND CCTV AUTOMATIC SELECTION MONITORING MANAGEMENT SERVER AND MANAGEMENT METHOD

(71) Applicant: Hyeong Yong Lee, Sejong-si (KR)

(72) Inventor: Hyeong Yong Lee, Sejong-si (KR)

( * ) Notice: Subject to any disclaimer, the term of this patent is extended or adjusted under 35 U.S.C. 154(b) by 0 days.

(21) Appl. No.: 15/771,240

(22) PCT Filed: Oct. 26, 2016

(86) PCT No.: PCT/KR2016/012061
§ 371 (c)(1),
(2) Date: Apr. 26, 2018

(87) PCT Pub. No.: WO2017/074005
PCT Pub. Date: May 4, 2017

(65) Prior Publication Data
US 2018/0324392 A1 Nov. 8, 2018

(30) Foreign Application Priority Data

Oct. 26, 2015 (KR) .......................... 10-2015-0148761

(51) Int. Cl.
*H04N 7/18* (2006.01)
*G08B 13/196* (2006.01)
(Continued)

(52) U.S. Cl.
CPC ......... *H04N 7/188* (2013.01); *G06K 9/00771* (2013.01); *G06Q 50/10* (2013.01); *G08B 13/196* (2013.01); *H04N 7/18* (2013.01)

(58) Field of Classification Search
CPC ........ G08B 13/196; G06Q 50/10; H04N 7/18; H04N 7/188; G06K 9/00771
(Continued)

(56) References Cited

U.S. PATENT DOCUMENTS

2017/0124398 A1* 5/2017 Birkbeck ............. H04N 13/139

FOREIGN PATENT DOCUMENTS

JP 2009-225239 A 10/2009
KR 10-2009-0125608 A 12/2009
(Continued)

*Primary Examiner* — Robert Chevalier
(74) *Attorney, Agent, or Firm* — Novick, Kim & Lee, PLLC; Sang Ho Lee

(57) ABSTRACT

Provided are a CCTV automatic selection monitoring system, and a CCTV automatic selection monitoring management server and management method. The CCTV automatic selection monitoring system includes: at least one CCTV camera for photographing at least one CCTV image; a CCTV automatic selection monitoring management server; and at least one controller monitor, wherein the CCTV automatic selection monitoring management server comprises: a server communication unit for receiving at least one piece of CCTV image data from the at least one CCTV camera; and a server control unit for analyzing the at least one piece of CCTV image data input from the server communication unit to calculate a selection score of the at least one piece of CCTV image data according to automatic selection elements corresponding to the at least one piece of CCTV image data, and classifying the at least one piece of CCTV image data according to the calculated selection score and then outputting the same to the at least one controller monitor.

13 Claims, 4 Drawing Sheets

(51) Int. Cl.
  *G06Q 50/10* (2012.01)
  *G06K 9/00* (2006.01)
(58) Field of Classification Search
  USPC ........ 348/143, 148, 149, 151; 386/278, 248,
  386/281, 224, 226
  See application file for complete search history.

(56) References Cited

FOREIGN PATENT DOCUMENTS

| | | |
|---|---|---|
| KR | 10-0980314 B1 | 9/2010 |
| KR | 10-2011-0001172 A | 1/2011 |
| KR | 10-2011-0119022 A | 11/2011 |
| KR | 10-1178539 B1 | 8/2012 |
| KR | 10-2014-0061231 A | 5/2014 |
| KR | 10-1436283 B1 | 8/2014 |
| KR | 10-1471846 B1 | 12/2014 |
| KR | 10-1509223 B1 | 4/2015 |
| KR | 10-2015-0112712 A | 10/2015 |

* cited by examiner

CCTV AUTOMATIC SELECTION MONITORING SYSTEM, AND CCTV AUTOMATIC SELECTION MONITORING MANAGEMENT SERVER AND MANAGEMENT METHOD

FIELD OF THE INVENTION

The present invention relates to a CCTV automatic selection monitoring system, a CCTV automatic selection monitoring management server and a CCTV automatic selection monitoring management method, and particularly, to a CCTV automatic selection monitoring system, a CCTV automatic selection monitoring management server and a CCTV automatic selection monitoring management method, which can automatically select CCTVs which need to be monitored so that CCTV controllers may effectively perform control works.

BACKGROUND OF THE INVENTION

As prevention of various incidents and accidents and real-time arrests are getting important, monitoring works of a U-City integrated control center or a CCTV integrated control center become more and more important. However, in the real world in which the scale of an integrated control center increases over time, it is physically and financially difficult to continuously increase CCTV controllers in reality. For example, the number of CCTVs managed by a controller is about two hundred in the case of an integrated control center of a metropolitan city, and it is very difficult for a controller to continuously monitor two hundred CCTVs for eight hours.

Therefore, it is required to provide a CCTV automatic selection monitoring service system, in which only CCTVs that need to be monitored by a controller are provided by automatically selecting CCTVs that do not need to be monitored so that CCTV controllers may effectively perform control works.

Recently, intelligent CCTVs or the like are adopted to effectively control CCTV images of such integrated control centers. Although the intelligent CCTVs are designed to automatically determine accidents and urgent situations, sometimes, they are not used due to frequent errors or malfunctions, and conventional intelligent CCTVs have a problem of generating high construction cost.

SUMMARY OF THE INVENTION

Technical Problem

Therefore, the present invention has been made in view of the above problems, and it is an object of the present invention to provide a CCTV automatic selection monitoring system, a CCTV automatic selection monitoring management server and a CCTV automatic selection monitoring management method, which can automatically select CCTVs which need to be monitored so that CCTV controllers may effectively perform control works.

Technical Solution

To accomplish the above object, a CCTV automatic selection monitoring system according to an embodiment of the present invention includes at least one CCTV camera for photographing at least one CCTV image, a CCTV automatic selection monitoring management server and at least one controller monitor, and the CCTV automatic selection monitoring management server comprises: a server communication unit for receiving at least one CCTV image data from the at least one CCTV camera; and a server control unit for analyzing the at least one CCTV image data received from the server communication unit, calculating a selection score of the at least one CCTV image data according to automatic selection elements corresponding to the at least one CCTV image data, classifying the at least one CCTV image data according to the calculated selection score, and outputting the classified CCTV image data to the at least one controller monitor.

To accomplish the above object, a CCTV automatic selection monitoring management server according to an embodiment of the present invention comprises: a server communication unit for receiving at least one CCTV image data from at least one CCTV camera photographing at least one CCTV image; and a server control unit for analyzing the at least one CCTV image data received from the server communication unit, calculating a selection score of the at least one CCTV image data according to automatic selection elements corresponding to the at least one CCTV image data, classifying the at least one CCTV image data according to the calculated selection score, and outputting the classified CCTV image data to at least one controller monitor.

To accomplish the above object, a CCTV automatic selection monitoring management method according to an embodiment of the present invention includes the steps of: receiving, by a server communication unit, at least one CCTV image data from at least one CCTV camera photographing at least one CCTV image; analyzing, by a server control unit, the at least one CCTV image data received from the server communication unit and calculating a selection score of the at least one CCTV image data according to automatic selection elements corresponding to the at least one CCTV image data; and classifying, by the server control unit, the at least one CCTV image data according to the calculated selection score and outputting the classified CCTV image data to at least one controller monitor.

Preferably, the automatic selection elements may include a motion sensing number corresponding to the number of motions sensed in the at least one CCTV image, and the server control unit may calculate a selection score of the at least one CCTV image data according to the motion sensing number.

In addition, preferably, the automatic selection elements may further include a motion sensing area corresponding to a specific area set in advance in the at least one CCTV image by the server control unit or a server manager, and when a selection score of the at least one CCTV image data is calculated, the server control unit may further reflect the number of motions sensed in the motion sensing area.

In addition, preferably, the automatic selection elements may further include a motion sensing duration time corresponding to a time during which motion sensing is continued in the at least one CCTV image, and when a selection score of the at least one CCTV image data is calculated, the server control unit may further reflect the motion sensing duration time.

In addition, preferably, the automatic selection elements may further include a motion progress pattern corresponding to a moving pattern of an object whose motion is detected in the at least one CCTV image, and when a selection score of the at least one CCTV image data is calculated, the server control unit may further reflect the motion progress pattern.

In addition, preferably, the server control unit may give an image grade to each of the at least one CCTV image data according to the calculated selection score and output the at least one CCTV image data to a controller monitor corresponding to each image grade.

In addition, preferably, the server control unit may differently set a range of a selection score corresponding to each image grade for each of the at least one CCTV images and may differently set the range according to a time zone or a day of a week.

To accomplish the above object, a computer-readable recording medium according to an embodiment of the present invention is a computer-readable recording medium recording a program for executing the CCTV automatic selection monitoring management method described above.

Advantageous Effects

Since the CCTV automatic selection monitoring system, the CCTV automatic selection monitoring management server and the CCTV automatic selection monitoring management method according to the present invention as described above automatically select CCTV images which need to be monitored and provide the selected images to a controller monitor so that a CCTV controller may effectively perform control works when the controller monitors numerous CCTV images at an integrated control center or the like, there is an effect of improving concentration and efficiency of monitoring as the controller may separately monitor the selected CCTV images.

In addition, since the CCTV automatic selection monitoring system, the CCTV automatic selection monitoring management server and the CCTV automatic selection monitoring management method according to the present invention as described above improves work efficiency of monitoring staff by adopting a system for physically filtering images to be monitored once, twice and three times, there is an effect of improving prevention of incidents and accidents and arrest rates by 60% or more compared with conventional monitoring methods.

In addition, the CCTV automatic selection monitoring system, the CCTV automatic selection monitoring management server and the CCTV automatic selection monitoring management method according to the present invention as described above have an effect of saving budgets needed for increasing control workers, preventing accidents in the disaster and safety field and the like, and reducing social overhead cost by improving real-time arrest rates.

In addition, the CCTV automatic selection monitoring system, the CCTV automatic selection monitoring management server and the CCTV automatic selection monitoring management method according to the present invention as described above have an approach different from that of conventional intelligent CCTVs, and there is an effect of differentiating the present invention from conventional techniques in that subsidiary services for improving efficiency of monitoring works of monitoring controllers are provided.

DETAILED DESCRIPTION OF THE PREFERRED EMBODIMENT

Figure 1:
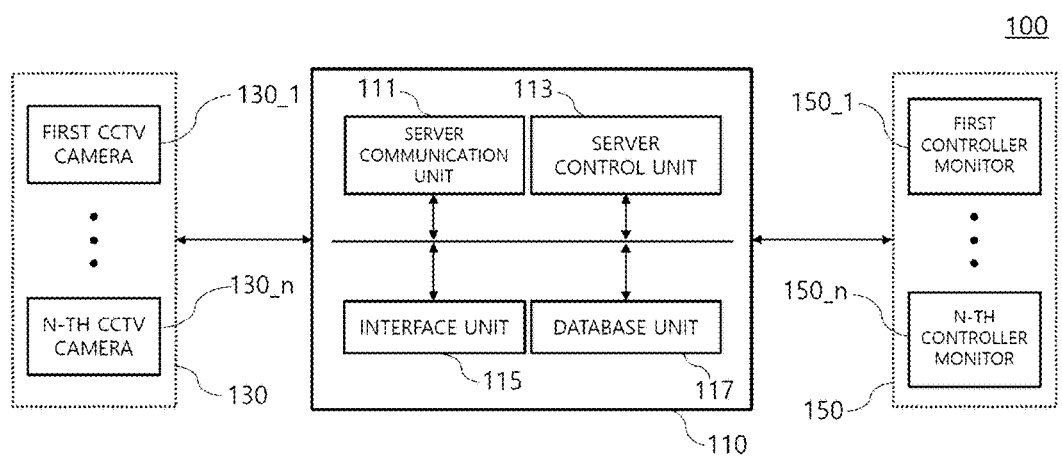
FIG. 1 is a view showing a CCTV automatic selection monitoring system according to an embodiment of the present invention.

To sufficiently understand the present invention, the operational advantages of the present invention and the objects accomplished by the embodiment of the present invention, it needs to refer the accompanying drawings exemplifying the preferred embodiments of the present invention and the contents stated in the drawings.

Hereinafter, the present invention will be described in detail by describing the preferred embodiments of the present invention with reference to the accompanying drawings. Like reference symbols presented in each drawing denote like members.

FIG. 1 is a view showing a CCTV automatic selection monitoring system according to an embodiment of the present invention. Referring to FIG. 1, a CCTV automatic selection monitoring system 100 according to an embodiment of the present invention may include a CCTV automatic selection monitoring management server 110, at least one CCTV camera 130 and at least one controller monitor 150. The CCTV automatic selection monitoring management server 110, the at least one CCTV camera 130 and the at least one controller monitor 150 shown in FIG. 1 may wiredly or wirelessly communicate with each other using a wired or wireless communication network (not shown). The wired or wireless communication network is a communication network capable of wired or wireless communication, and since it is widely known to those skilled in the art, detailed descriptions thereof will be omitted.

The CCTV automatic selection monitoring management server 110 may include a server communication unit 111 and a server control unit 113 and may further include an interface unit 115 and a database unit 117 according to embodiments.

The server communication unit 111 may receive at least one CCTV image data from the at least one CCTV camera 130. The server communication unit 111 may wiredly or wirelessly exchange data with the at least one CCTV camera 130 and the at least one controller monitor 150 through the wired or wireless communication network. The server communication unit 111 may be implemented as a wired communication module supporting TCP/IP or the like or a communication module supporting at least one of various wireless communication methods such as Wideband Code Division Multiple Access (WCDMA), Long Term Evolution (LTE), Wireless Broadband Internet (WiBro), Wireless Fidelity (WiFi) and the like. The server communication unit 111 may be implemented as a communication module supporting at least one of various communication methods as described above and may be changed diversely within a scope known to those skilled in the art.

The server control unit 113 may analyze at least one CCTV image data received from the server communication unit 111 and calculate a selection score of the at least one CCTV image data according to automatic selection elements corresponding to the at least one CCTV image data.

For example, the automatic selection elements may include a motion sensing number corresponding to the number of motions sensed in the at least one CCTV image. The server control unit 113 may analyze at least one CCTV image data and determine the number of objects moving in the image as the motion sensing number, and calculate a selection score of the at least one CCTV image data according to the motion sensing number. For example, if three moving objects are sensed in the CCTV image, the server control unit 113 may calculate total three points of selection score by giving one point per one moving object. It may be determined that the more the moving objects are in a CCTV image, necessity of monitoring by a controller also increases, and the points of selection score per one moving object may be set in advance by the server control unit 113.

According to embodiments, the server control unit 113 may differentially give a selection score according to the type of a moving object. That is, the server control unit 113 may analyze at least one CCTV image data and give two points of selection score per one vehicle by applying a weighting factor if moving vehicles are sensed and give one point of selection score per person if moving persons are sensed. The server control unit 113 may identify whether a moving object is a vehicle or a person using an image recognition technique known to those skilled in the art.

In addition, the server control unit 113 may not give a selection score if the moving time of an object is less than a minimum moving time. That is, if the minimum moving time is one second, the server control unit 113 may analyze at least one CCTV image data and may not give a selection score if the moving time of the object is less than one second. The minimum moving time may be set diversely.

In addition, the automatic selection elements may further include a motion sensing area corresponding to a specific area set in advance in at least one CCTV image by the server control unit 113 or a server manager. When a selection score of the at least one CCTV image data is calculated, the server control unit 113 may further reflect the number of motions sensed in the motion sensing area. The motion sensing area is an area in which accidents frequently occur or an area set as a dangerous area by the server manager, and the server control unit 113 may analyze at least one CCTV image data and apply a weighting factor to a selection score given to a moving object if the moving object is sensed in the motion sensing area. For example, the server control unit 113 may give one point of selection score if a moving object is sensed in an area other than the motion sensing area and give two points of selection score if a moving object is sensed in the motion sensing area. A plurality of areas may be set as motion sensing areas in a CCTV image, and a weighting factor applied to each of the plurality of areas may be set to be different from the others. It may be determined that the more the moving objects are in an area set in a CCTV image as a motion sensing area, necessity of monitoring by a controller also increases.

In addition, the automatic selection elements may further include a motion sensing duration time corresponding to a time during which motion sensing is continued in the at least one CCTV image. When a selection score of the at least one CCTV image data is calculated, the server control unit 113 may further reflect the motion sensing duration time. For example, the server control unit 113 may analyze at least one CCTV image data and further give three points of selection score if the time during which a motion of an object continues is ten seconds or more. In addition, the server control unit 113 may give a higher selection score if the time of sensing a motion of a specific object in the at least one CCTV image is the longer. That is, the server control unit 113 may analyze at least one CCTV image data and give three points of selection score if the time during which a motion of an object continues is ten seconds or more or give five points of selection score if the time during which a motion of an object continues is twenty seconds or more. If there is an object whose motion is detected for a long time in a CCTV image, it may be determined that necessity of monitoring by a controller increases, and a selection score according to a time during which a motion continues may be set diversely.

In addition, the automatic selection elements may further include a motion progress pattern corresponding to a moving pattern of an object whose motion is detected in the at least one CCTV image. The motion progress pattern is a moving pattern of an object whose motion is detected, and the server control unit 113 may analyze at least one CCTV image data and detect a pattern of moving up, down, left or right and collision or overlapping with other patterns. When a selection score of the at least one CCTV image data is calculated, the server control unit 113 may further reflect the motion progress pattern. For example, the server control unit 113 may analyze at least one CCTV image data and give five points of selection score if a pattern of a plurality of objects approaching each other is sensed in the CCTV image or give ten points of selection score if a pattern of a plurality of objects colliding with each other is sensed. If the objects are overlapped or collide with each other in a CCTV image, it may be determined that necessity of monitoring by a controller increases, and a selection score according to a motion progress pattern may be set diversely according to a degree of risk. In addition, the motion progress pattern of a CCTV image sensed by the server control unit 113 may be changed diversely and stored in advance in the database unit 117.

In summary, when the at least one CCTV image data received from the server communication unit 111 is analyzed, the server control unit 113 may calculate a selection score of each CCTV image data according to the automatic selection elements including the motion sensing number, the motion sensing area, the motion sensing duration time, the motion progress pattern and the like. The selection score according to each of the automatic selection elements may be set diversely. The server control unit 113 may analyze at least one CCTV image data using a technique of sensing and analyzing motions of an image, which is known to those skilled in the art.

Meanwhile, the server control unit 113 may set the automatic selection elements for each CCTV camera. That is, the server control unit 113 may differently set the automatic selection elements of at least one CCTV camera 130, such as the motion sensing area, the motion sensing duration time, the motion progress pattern and the like, and may also differently set the selection score according to each automatic selection element. For example, if a first CCTV camera 130_1 is a surveillance camera installed at a desolate entrance of a village, where incidents or accidents did not occur until present, a motion sensing area may not be set separately, and a selection score according to an object whose motion is detected is set high so that a corresponding CCTV image may be outputted to the controller monitor 150 even when movement of a small number of objects is sensed. As another example, if an n-th CCTV camera 130_n is a surveillance camera installed in a commercial area having a large floating population, where incidents and accidents have occurred until present, an area highly related to the incidents and accidents in a CCTV photographing area may be specified as a dangerous area and set as a motion sensing area, and objects merely passing by the CCTV photographing area may be excluded from being monitored by applying the selection score only to the objects whose motion sensing duration time is measured to be longer than a predetermined time. Accordingly, a selection score may be calculated by applying different automatic selection elements to each CCTV image, considering the features of a place where at least one CCTV camera 130 is installed.

In addition, according to embodiments, the server control unit 113 may differently set the automatic selection elements such as the motion sensing area, the motion sensing duration time, the motion progress pattern and the like for at least one CCTV camera 130 according to a photographing time zone or a photographing day of a week and may differently set the selection score according to each automatic selection element.

Meanwhile, the server control unit 113 may analyze at least one CCTV image data in real-time and set the selection score in real-time, and may analyze at least one CCTV image data at predetermined image sensing intervals. The image sensing interval may be diversely set to ten seconds, thirty seconds, one minute or the like and may be set in advance by the server control unit 113.

In addition, the server control unit 113 may classify at least one CCTV image data according to the calculated selection score and output the classified CCTV image data to at least one controller monitor 150. The server control unit 113 may select a controller monitor 150 for receiving the classified CCTV image data according to the selection score of each CCTV image data.

For example, the server control unit 113 may give an image grade to each of the at least one CCTV image data according to the selection score calculated from the CCTV image data and output the at least one CCTV image data to a controller monitor corresponding to each image grade. For example, the server control unit 113 may not output a corresponding CCTV image to the controller monitor 150 if the selection score of a corresponding CCTV image data is between zero and nine points, and if the selection score of a corresponding CCTV image data is between ten and fifteen points, the server control unit 113 may classify the CCTV image data as monitoring grade 3 and transmit the corresponding CCTV image to a controller monitor corresponding to monitoring grade 3. In addition, if the selection score of a corresponding CCTV image data is between sixteen and twenty points, the server control unit 113 may classify the CCTV image data as monitoring grade 2 and transmit the corresponding CCTV image to a controller monitor corresponding to monitoring grade 2, and if the selection score of a corresponding CCTV image data is twenty one points or higher, the server control unit 113 may classify the CCTV image data as monitoring grade 1 and transmit the corresponding CCTV image to a controller monitor corresponding to monitoring grade 1. For example, a controller monitor corresponding to monitoring grade 1 may be arranged at the center and provided with a further larger screen, and a controller monitor corresponding to monitoring grade 2 or 3 may be arranged in the periphery and provided with a comparatively small screen. Accordingly, a CCTV controller may effectively monitor a CCTV image corresponding to each image grade according to the importance of the grade. In addition, if a selection score calculated through the automatic selection elements is lower than a minimum grading standard, the CCTV image is determined as a CCTV image that does not need to be monitored and may not be outputted to a controller monitor 150.

According to embodiments, the server control unit 113 may diversely set a range of a selection score corresponding to each image grade. For example, the server control unit 113 may differently set a range of a selection score corresponding to each image grade for each of the at least one CCTV images. For example, the server control unit 113 may set the range in a manner of classifying a CCTV image photographed by the first CCTV 130_1 as monitoring grade 1 if the selection score of the CCTV image is twenty one points or more and classifying a CCTV image photographed by the n-th CCTV 130_n as monitoring grade 1 if the selection score of the CCTV image is twenty five points or more. In addition, the server control unit 113 may differently set a range of a selection score corresponding to each image grade according to a photographing time zone, a photographing day of a week, whether or not a specific date or the like. That is, since it is general that the floating population is large on holidays rather than on ordinary days and during the daytime rather than during the night time, a range of a selection score corresponding to each image grade may be set differently according to a photographing time zone, a photographing day of a week, whether or not a specific date or the like considering the features of a CCTV photographing area.

Meanwhile, the server control unit 113 may output the at least one CCTV image received from the at least one CCTV camera 130 to the at least one CCTV controller monitor 150 in order of the selection score calculated according to the automatic selection elements.

In addition, the server control unit 113 may periodically analyze the at least one CCTV image data received from the at least one CCTV camera 130 and periodically update the image grade of each CCTV image.

Meanwhile, the server control unit 113 is a part of the CCTV automatic selection monitoring management server 110 and may be implemented and operated by a software application program stored in and executed by the CCTV automatic selection monitoring management server 110. In addition, the server control unit 113 is a constitutional element for controlling various constitutional elements of the CCTV automatic selection monitoring management server 110 and processing diverse data and may be implemented by a central processing unit such as a CPU processor. The operation of the server control unit 113 will be described below in detail with reference to FIG. 2, and the detailed descriptions thereof will be omitted herein.

The interface unit 115 may transmit a signal received from a user to the server control unit 113. The interface unit 115 may be implemented by various types of input devices such as a touch screen, a keyboard and a mouse capable of receiving an interface signal from a user to control the CCTV automatic selection monitoring management server 110 and may be diversely changed within a scope known to those skilled in the art.

The database unit 117 may store various data, such as at least one CCTV image data, data on automatic selection elements, data on selection scores and the like, needed for operation of the CCTV automatic selection monitoring management server 110 and may be implemented by various data storage devices known to those skilled in the art. The database unit 117 may be implemented as various types of storage devices such as a Hard Disk Drive (HDD), an Electrically Erasable and Programmable Read Only Memory (EEPROM) and the like.

The at least one CCTV camera 130 may photograph at least one CCTV image and transmit at least one CCTV image data to the CCTV automatic selection monitoring management server 110. The at least one CCTV camera 130 may include a first CCTV camera 130_1 to an n-th CCTV camera 130_n, and n may be a natural number. The at least one CCTV camera 130 may photograph an image on the front side, create a CCTV image data, and modulate, amplify and transmit the created CCTV image data to the CCTV automatic selection monitoring management server 110. For example, the at least one CCTV camera 130 may be embedded with a signal modulation circuit and a signal amplification circuit and create a high quality HD image data of two million pixels or more.

The at least one CCTV camera 130 may be implemented in various forms such as a rectangular box, a circular dome, a camera-integrated form and the like and may include an input and output terminal for transmitting and receiving CCTV image data. The input and output terminal may be a BNC input and output terminal, a 2P input and output terminal (an RJ-11 input terminal) or a RJ-45 input and output terminal, and other than these, it may be implemented as an input and output terminal that can be connected to various cables capable of transmitting image data. For example, the at least one CCTV camera 130 may be connected to the CCTV automatic selection monitoring management server 110 through a coaxial cable, a 2P cable, an Unshielded Twisted Pair (UTP) cable or the like.

The at least one controller monitor 150 may display the at least one CCTV image data received from the CCTV automatic selection monitoring management server 110 on a screen. For example, the at least one controller monitor 150 may include a first controller monitor 150_1 to an n-th controller monitor 150_n, and n may be a natural number. For example, the at least one controller monitor 150 may be classified by grade as described above and implemented by various types of display devices such as a CRT monitor, a liquid crystal display (LCD), a light emitting diode (LED), an organic LED and the like.

The CCTV automatic selection monitoring system 100 according to an embodiment of the present invention as described above may be applied to a U-City integrated control center or a CCTV integrated control center for twenty four hours to automatically select images needed for monitoring from numerous CCTV images and provide the selected images to a corresponding controller monitor 150 corresponding to an image grade classified according to importance. The capability of a monitor of a controller may be degraded if a great deal of CCTV control is continuously performed, and the CCTV automatic selection monitoring system 100 according to an embodiment of the present invention has an advantage of preventing the deterioration of monitoring capability of the controller and providing a concentrative and effective monitoring service. The operation of the CCTV automatic selection monitoring system 100 according to an embodiment of the present invention as shown in FIG. 1 will be additionally described in detail with reference to FIGS. 2 to 4.

Figure 2:
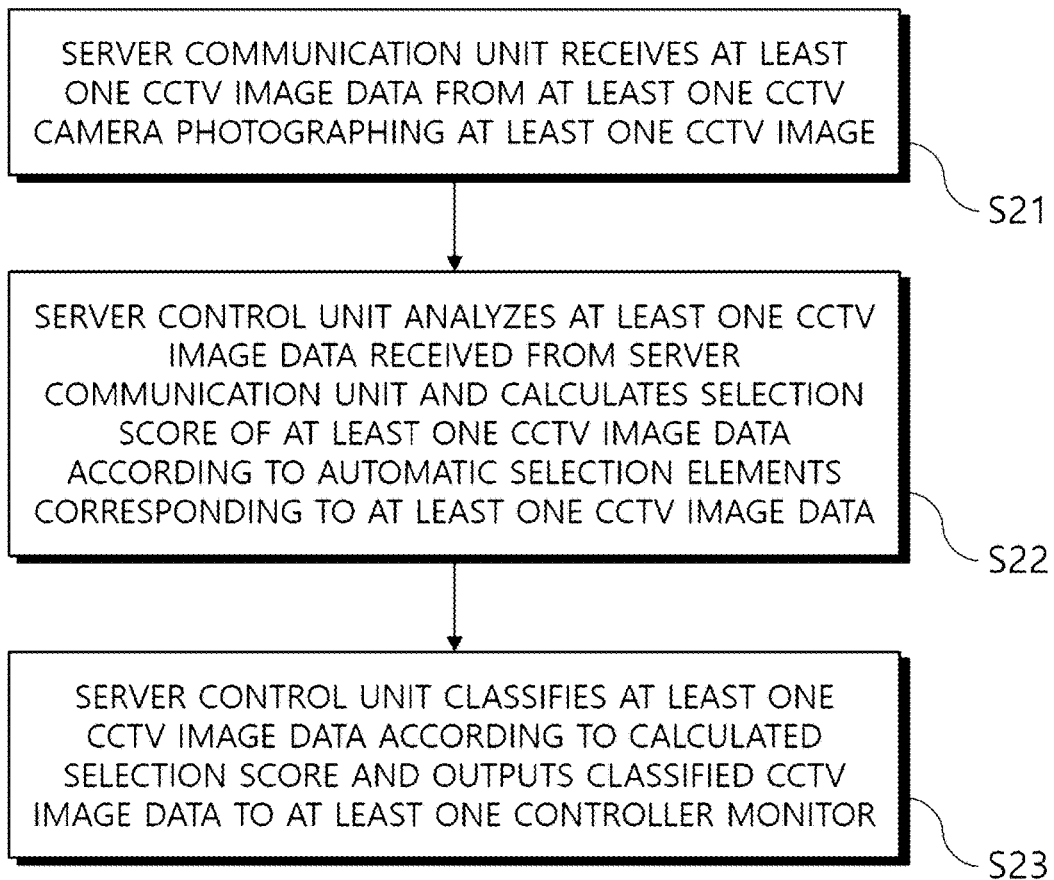
FIG. 2 is a flowchart illustrating a CCTV automatic selection monitoring management method according to an embodiment of the present invention.

FIG. 2 is a flowchart illustrating a CCTV automatic selection monitoring management method according to an embodiment of the present invention. For example, a CCTV automatic selection monitoring management method 200 according to an embodiment of the present invention shown in FIG. 2 may be performed by the CCTV automatic selection monitoring management server 110 of the present invention described above with reference to FIG. 1.

Referring to FIG. 2, the CCTV automatic selection monitoring management method 200 according to an embodiment of the present invention may include the step of receiving, by the server communication unit 111, at least one CCTV image data from at least one CCTV camera 130 photographing at least one CCTV image (step S21). Since step S21 has been described above in the description of the at least one CCTV camera 130 and the server communication unit 111 with reference to FIG. 1, detailed descriptions thereof will be omitted.

Next, the CCTV automatic selection monitoring management method 200 according to an embodiment of the present invention may include the step of analyzing, by the server control unit 113, the at least one CCTV image data received from the server communication unit 111 and calculating a selection score of the at least one CCTV image data according to automatic selection elements corresponding to the at least one CCTV image data (step S22).

As described above with reference to FIG. 1, the automatic selection elements may include a motion sensing number corresponding to the number of motions sensed in the at least one CCTV image, and the server control unit 113 may calculate a selection score of the at least one CCTV image data according to the motion sensing number. In addition, the automatic selection elements may further include a motion sensing area corresponding to a specific area set in advance in at least one CCTV image by the server control unit 113 or a server manager, and when a selection score of the at least one CCTV image data is calculated, the server control unit 113 may further reflect the number of motions sensed in the motion sensing area. In addition, the automatic selection elements may further include a motion sensing duration time corresponding to a time during which motion sensing is continued in the at least one CCTV image, and when a selection score of the at least one CCTV image data is calculated, the server control unit 113 may further reflect the motion sensing duration time. In addition, the automatic selection elements may further include a motion progress pattern corresponding to a moving pattern of an object whose motion is detected in the at least one CCTV image, and when a selection score of the at least one CCTV image data is calculated, the server control unit 113 may further reflect the motion progress pattern.

Next, the CCTV automatic selection monitoring management method 200 according to an embodiment of the present invention may include the step of classifying, by the server control unit 113, the at least one CCTV image data according to the calculated selection score and outputting the classified CCTV image data to at least one controller monitor 150 (step S23).

As described above with reference to FIG. 1, the server control unit 113 may give an image grade to each of the at least one CCTV image data according to the calculated selection score and output the at least one CCTV image data to a controller monitor corresponding to each image grade. In addition, the server control unit 113 may differently set a range of a selection score corresponding to each image grade for each of the at least one CCTV images and may differently set the range according to a time zone or a day of a week.

Since the CCTV automatic selection monitoring management method 200 according to an embodiment of the present invention is similar to the contents described above with reference to FIG. 1, additional descriptions thereof will be omitted.

Meanwhile, the CCTV automatic selection monitoring management method according to the present invention may be performed by a computer-readable recording medium in which a program for performing the CCTV automatic selection monitoring management method described above with reference to FIGS. 1 and 2 is recorded. In addition, the CCTV automatic selection monitoring management method according to the present invention may be performed by a computer program stored in a medium, in combination with hardware, to execute the CCTV automatic selection monitoring management method described above with reference to FIGS. 1 and 2.

Figure 3:
FIGS. 3 and 4 are views exemplarily showing a method of calculating a selection score of a CCTV image according to automatic selection elements by a CCTV automatic selection monitoring management server according to an embodiment of the present invention.
Figure 4:

FIGS. 3 and 4 are views exemplarily showing a method of calculating a selection score of a CCTV image according to automatic selection elements by a CCTV automatic selection monitoring management server according to an embodiment of the present invention. For example, FIGS. 3 and 4 assume a case of not outputting a corresponding CCTV image to the controller monitor 150 if the selection score of a corresponding CCTV image data is between zero and nine points, classifying a corresponding CCTV image data as monitoring grade 3 if the selection score of the CCTV image data is between ten and fifteen points, classifying a corresponding CCTV image data as monitoring grade 2 if the selection score of the CCTV image data is between sixteen and twenty points, and classifying a corresponding CCTV image data as monitoring grade 1 if the selection score of the CCTV image data is twenty one points or higher. In addition, FIGS. 3 and 4 assume a case of giving one point of selection score per one moving object, giving five points of selection score if a moving object is sensed in a motion sensing area, further giving three points of selection score if a time during which a motion of an object continues is ten seconds or more, and giving ten points of selection score if an abnormal pattern such as a pattern of a plurality of objects colliding with each other is sensed. The range of the selection scores corresponding to the image grades and magnitude of the selection score given according to each motion may be changed diversely as described above with reference to FIG. 1.

Referring to the CCTV image on the left side of FIG. 3, since the number of moving objects sensed on the screen is three, three points of selection score may be given; since one moving object is sensed in the dangerous areas of a rectangular shape set on both sides as motion sensing areas, five points of selection score may be given; since a motion sensing duration time of ten seconds or more is sensed, three points of selection score may be given; and since an abnormal motion sensing progress pattern is not sensed, zero point of selection score may be given. Since the sum of the selection scores is eleven points, the corresponding CCTV image may be classified as grade 3 and outputted to a controller monitor of grade 3.

Referring to the CCTV image on the right side of FIG. 3, since the number of moving objects sensed on the screen is four, four points of selection score may be given; since two moving objects are sensed in the dangerous areas of a rectangular shape set on both sides as motion sensing areas, ten points of selection score may be given; since a motion sensing duration time of ten seconds or more is sensed, three points of selection score may be given; and since an abnormal motion sensing progress pattern is not sensed, zero point of selection score may be given. Since the sum of the selection scores is seventeen points, the corresponding CCTV image may be classified as grade 2 and outputted to a controller monitor of grade 2.

Next, referring to the CCTV image on the left side of FIG. 4, since the number of moving objects sensed on the screen is six, six points of selection score may be given; since one moving object is sensed in the dangerous areas of a rectangular shape set on both sides as motion sensing areas, five points of selection score may be given; since the number of areas where a plurality of objects is overlapped with each other is two, six points of selection score may be given; since a motion sensing duration time of ten seconds or more is sensed, three points of selection score may be given; and since an abnormal motion sensing progress pattern is not sensed, zero point of selection score may be given. Since the sum of the selection scores is twenty points, the corresponding CCTV image may be classified as grade 2 and outputted to a controller monitor of grade 2.

Next, referring to the CCTV image on the right side of FIG. 4, since the number of moving objects sensed on the screen is three, three points of selection score may be given; since one moving object is sensed in the dangerous areas of a rectangular shape set on both sides as motion sensing areas, five points of selection score may be given; since the number of areas where a plurality of objects is overlapped with each other is one, three points of selection score may be given; since a motion sensing duration time of ten seconds or more is sensed, three points of selection score may be given; and since an abnormal pattern of overlapping a progress pattern of a vehicle moving downward and a progress pattern of a person moving toward the left side is sensed, ten points of selection score may be given. Since the sum of the selection scores is twenty four points, the corresponding CCTV image may be classified as grade 1 and outputted to a controller monitor of grade 1.

Meanwhile, all the screens shown in FIGS. 3 and 4 are illustrative, and the configuration of a dangerous area or a screen of a rectangular shape may be diversely changed within a scope known to those skilled in the art.

The diverse embodiments described in this specification may be implemented by hardware, middleware, microcodes, software and/or a combination of these. For example, the diverse embodiments may be implemented within one or more of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions proposed herein, and a combination of these.

In addition, for example, the diverse embodiments may be recorded or encoded in a computer-readable medium which stores commands. The commands recorded or encoded in the computer-readable medium may, for example, perform the method when the commands are executed by a programmable processor or other processors. The computer-readable medium includes a computer storage medium and all of communication media including an arbitrary medium which facilitates transfer of a computer program from one place to another place. The storage medium may be an arbitrary available medium that can be accessed by a computer. For example, such a computer-readable medium may include RAM, ROM, EEPROM, CD-ROM or other optical disk storage media, magnetic disk storage media or other magnetic storage media, or arbitrary other media that can be used to return or store desired program codes in the form of commands or data structures that can be accessed by a computer.

The hardware, software, firmware and the like may be implemented in the same device or individual devices to support various operations and functions described in this specification. Additionally, the constitutional elements, units, modules, components and the like stated as "~unit" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

Although the operations are shown in the drawings in a specific order, it should be understood that these operations do not need to be performed in a specific order or a sequential order shown in the drawings or all the operations shown in the drawings do not need to be performed to accomplish a desired result. In a certain environment, multitasking and parallel processing may be advantageous.

Furthermore, it should be understood that classification of the diverse constitutional elements in the embodiments described above is not needed in all embodiments, and the described constitutional elements may be generally integrated together as a single software product or packaged as a plurality of software products.

Although the present invention has been described with reference to the embodiments shown in the drawings, it is merely illustrative, and those skilled in the art may understand that diverse modifications and equivalent other embodiments are possible. Accordingly, the true technical protection scope of the present invention should be defined by the technical spirits of appended claims.

What is claimed is:

1. A CCTV automatic selection monitoring management server comprising:
   a server communication unit for receiving at least one CCTV image data from at least one CCTV camera photographing at least one CCTV image; and
   a server control unit for analyzing the at least one CCTV image data received from the server communication unit, calculating a selection score of the at least one CCTV image data according to automatic selection elements corresponding to the at least one CCTV image data, classifying the at least one CCTV image data according to the calculated selection score, and outputting the classified CCTV image data to at least one controller monitor, wherein the automatic selection elements include a motion sensing number corresponding to the number of motions sensed in the at least one CCTV image, and the server control unit calculates a selection score of the at least one CCTV image data according to the motion sensing number.

2. The server according to claim 1, wherein the automatic selection elements further include a motion sensing area corresponding to a specific area set in advance in the at least one CCTV image by the server control unit or a server manager, and when a selection score of the at least one CCTV image data is calculated, the server control unit further reflects the number of motions sensed in the motion sensing area.

3. The server according to claim 2, wherein the automatic selection elements further include a motion sensing duration time corresponding to a time during which motion sensing is continued in the at least one CCTV image, and when a selection score of the at least one CCTV image data is calculated, the server control unit further reflects the motion sensing duration time.

4. The server according to claim 3, wherein the automatic selection elements further include a motion progress pattern corresponding to a moving pattern of an object whose motion is detected in the at least one CCTV image, and when a selection score of the at least one CCTV image data is calculated, the server control unit further reflects the motion progress pattern.

5. A CCTV automatic selection monitoring management server comprising:
   a server communication unit for receiving at least one CCTV image data from at least one CCTV camera photographing at least one CCTV image; and
   a server control unit for analyzing the at least one CCTV image data received from the server communication unit, calculating a selection score of the at least one CCTV image data according to automatic selection elements corresponding to the at least one CCTV image data, classifying the at least one CCTV image data according to the calculated selection score, and outputting the classified CCTV image data to at least one controller monitor, wherein the server control unit gives an image grade to each of the at least one CCTV image data according to the calculated selection score and outputs the at least one CCTV image data to a controller monitor corresponding to each image grade.

6. The server according to claim 5, wherein the server control unit may differently set a range of a selection score corresponding to each image grade for each of the at least one CCTV images and may differently set the range according to a time zone or a day of a week.

7. A CCTV automatic selection monitoring management method comprising the steps of:
   receiving, by a server communication unit, at least one CCTV image data from at least one CCTV camera photographing at least one CCTV image;
   analyzing, by a server control unit, the at least one CCTV image data received from the server communication unit and calculating a selection score of the at least one CCTV image data according to automatic selection elements corresponding to the at least one CCTV image data; and
   classifying, by the server control unit, the at least one CCTV image data according to the calculated selection score and outputting the classified CCTV image data to at least one controller monitor, wherein the automatic selection elements include a motion sensing number corresponding to the number of motions sensed in the at least one CCTV image, and the server control unit calculates a selection score of the at least one CCTV image data according to the motion sensing number.

8. The method according to claim 7, wherein the automatic selection elements further include a motion sensing area corresponding to a specific area set in advance in the at least one CCTV image by the server control unit or a server manager, and when a selection score of the at least one CCTV image data is calculated, the server control unit further reflects the number of motions sensed in the motion sensing area.

9. The method according to claim 8, wherein the automatic selection elements further include a motion sensing duration time corresponding to a time during which motion sensing is continued in the at least one CCTV image, and when a selection score of the at least one CCTV image data is calculated, the server control unit further reflects the motion sensing duration time.

10. The method according to claim 9, wherein the automatic selection elements further include a motion progress pattern corresponding to a moving pattern of an object whose motion is detected in the at least one CCTV image, and when a selection score of the at least one CCTV image data is calculated, the server control unit further reflects the motion progress pattern.

11. A CCTV automatic selection monitoring management method comprising the steps of:
   receiving, by a server communication unit, at least one CCTV image data from at least one CCTV camera photographing at least one CCTV image;
   analyzing, by a server control unit, the at least one CCTV image data received from the server communication unit and calculating a selection score of the at least one CCTV image data according to automatic selection elements corresponding to the at least one CCTV image data; and
   classifying, by the server control unit, the at least one CCTV image data according to the calculated selection score and outputting the classified CCTV image data to at least one controller monitor, wherein the server control unit gives an image grade to each of the at least one CCTV image data according to the calculated selection score and outputs the at least one CCTV image data to a controller monitor corresponding to each image grade.

12. The method according to claim 11, wherein the server control unit may differently set a range of a selection score corresponding to each image grade for each of the at least one CCTV images and may differently set the range according to a time zone or a day of a week.

13. A non-transitory computer-readable recording medium recording a program for executing a CCTV automatic selection monitoring management method according to claim 7.

* * * * *